Dec. 22, 1942.  E. R. HATHAWAY  2,305,871
ARM REST
Filed May 24, 1939  3 Sheets-Sheet 2
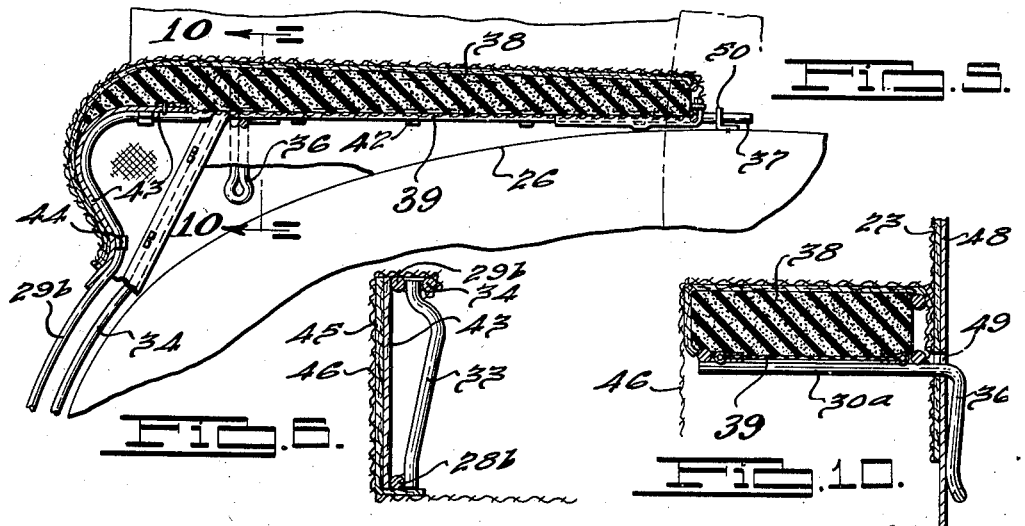
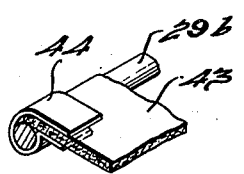
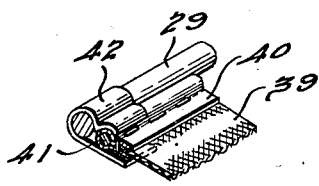
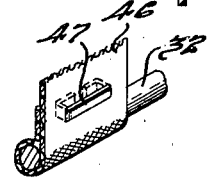
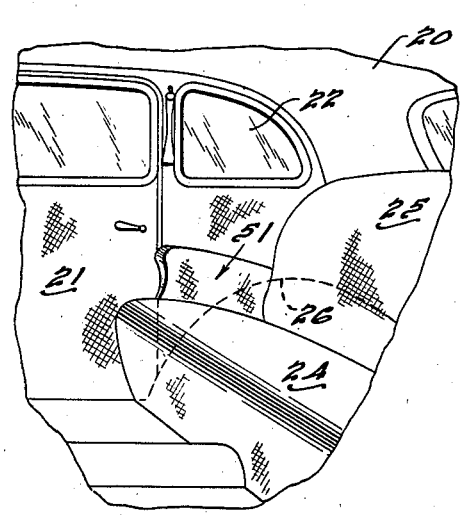
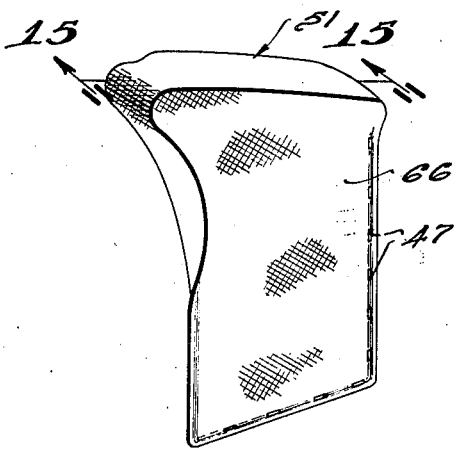
INVENTOR
Edward R. Hathaway.
BY
Dike, Calver & Gray
ATTORNEYS.

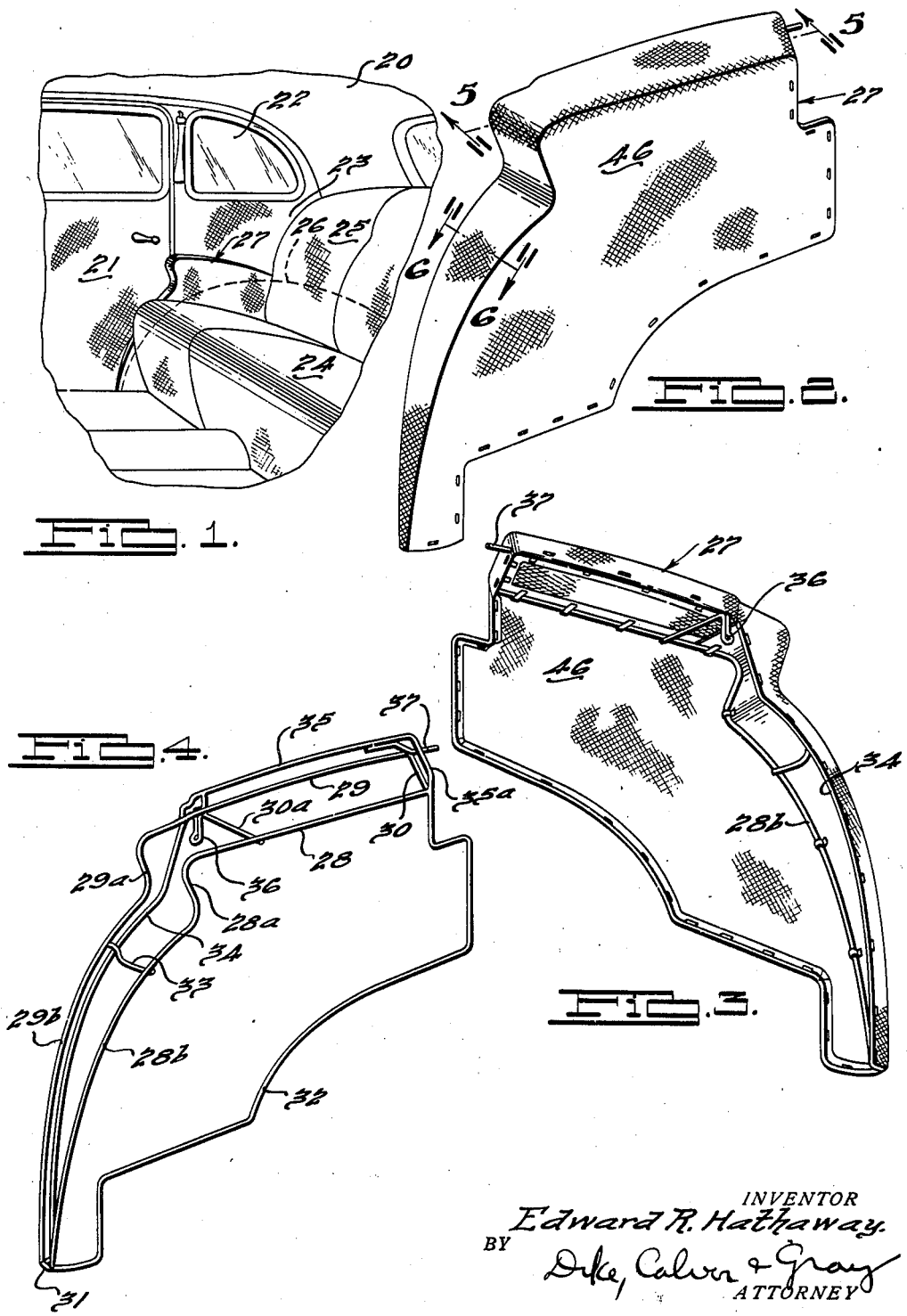

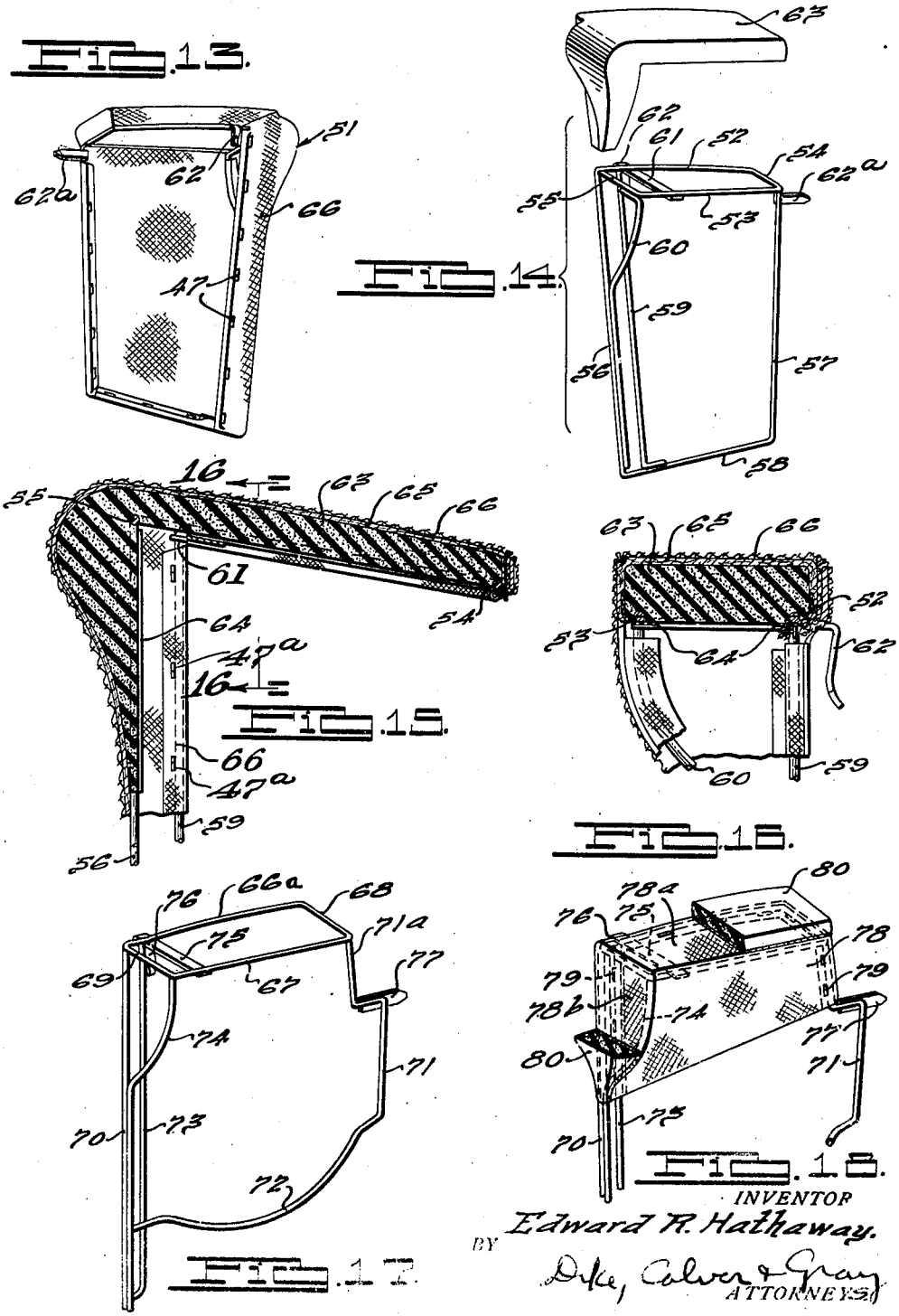

Patented Dec. 22, 1942

2,305,871

UNITED STATES PATENT OFFICE 2,305,871

ARMREST

Edward R. Hathaway, Detroit, Mich., assignor to Briggs Manufacturing Company, Detroit, Mich., a corporation of Michigan Application May 24, 1939, Serial No. 275,339

11 Claims. (Cl. 155—198)

This invention relates to arm rests for vehicle bodies, particularly automobile bodies, an object of the invention being to provide an improved arm rest especially adapted for use in association with the rear seat of an automobile of the sedan type, the arm rest being constructed in simplified and compact manner, providing a relatively light weight inexpensive structure while affording the maximum comfort to the passenger.

A further object is to provide an arm rest having a skeleton frame fabricated of wire providing a light, economical framework constructed to support the padding and trim materials in simple efficient manner.

A further object of the invention is to provide a composite arm rest for an automobile or other vehicle body having a wire formed supporting frame, sponge rubber padding carried thereby and trim material covering said portions.

Other objects of this invention will appear in the following description and appended claims, reference being had to the accompanying drawings forming a part of this specification wherein like reference characters designate corresponding parts in the several views.

Fig. 1 is a fragmentary perspective view of the interior of an automobile body adjacent the rear quarter thereof, showing an arm rest in accordance with the present invention installed therein.

Fig. 2 is a perspective view of the arm rest of Fig. 1.

Fig. 3 is a perspective view of the arm rest, this view being taken from the rear side thereof.

Fig. 4 is a perspective view of the wire formed skeleton frame for the arm rest.

Fig. 5 is an enlarged section taken substantially through lines 5—5 of Fig. 2 looking in the direction of the arrows.

Fig. 6 is an enlarged section taken substantially through lines 6—6 of Fig. 2 looking in the direction of the arrows.

Figs. 7, 8 and 9 are fragmentary sectional detail views illustrating the manner of attaching certain portions of the arm rest assembly.

Fig. 10 is a section taken substantially through lines 10—10 of Fig. 5 looking in the direction of the arrows.

Fig. 11 is a view similar to Fig. 1 illustrating a second embodiment of the invention.

Fig. 12 is a perspective view of the arm rest installed as shown in Fig. 11.

Fig. 13 is a perspective view of the arm rest of Fig. 12 looking from the rear side thereof.

Fig. 14 is an exploded view of the arm rest frame and pad of Fig. 13.

Fig. 15 is an enlarged section taken substantially through lines 15—15 of Fig. 12 looking in the direction of the arrows.

Fig. 16 is a section taken substantially through lines 16—16 of Fig. 15 looking in the direction of the arrows.

Fig. 17 is a perspective view of the wire formed skeleton frame of a third embodiment of the invention.

Fig. 18 is a fragmentary view, partly in section, illustrating the pad and attaching fabric mounted upon the frame of Fig. 17.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings I have illustrated, by way of example, several embodiments of the present invention, in each instance the arm rest unit being constructed and arranged for mounting over the wheel housing of an automobile of the sedan type. Referring to Fig. 1 there is shown at 20 the rear portion of an automobile body having a rear door 21, a rear quarter window 22, a trim panel 23 covering the rear quarter adjacent the window 22, a rear seat cushion 24 and a back cushion 25. The wheel housing 26 is indicated by the dotted line in Fig. 1 and mounted at the end of the seat cushion 24 over the wheel housing is an arm rest unit 27 constructed in accordance with one embodiment of the invention illustrated in Figs. 2 to 10 inclusive.

The arm rest 27 of the embodiment of Figs. 2 to 10 inclusive comprises a wire formed skeleton frame comprising one or more lengths of wire bent and joined together to provide a support for the padding and upholstery material of the arm rest. As illustrated in Fig. 4 the arm rest frame comprises upper generally parallel and coplanar courses 28 and 29 connected together by an end section 30 and by a cross wire piece 30a, this top frame being generally rectangular. At their forward ends the wire courses 28 and 29 have down bent portions 28a and 29a and the forward and downwardly extending continuations 28b and 29b of the bent portions 28a and 29a provide in effect a dog leg overlying the forward portion of the wheel housing. The courses 28b and 29b preferably converge to a terminal point 31 where they are joined together. They are also braced by means of a cross tie wire piece 33. Lying at the inner side of the frame is a wire connecting member 32 which is suitably bent to the desired shape and extends from the point 31 to the juncture of the wire portions 28 and 30. Extending generally parallel to the portions 29 and 30, but spaced thereabove, is a bent wire member comprising longitudinal and end sections 35 and 35a, respectively, which are connected at their ends to the courses 28 and 29. Extending rearwardly of and in spaced relation to the member 29b is a bracing section 34 which is joined to the end of the portion 29 and also to the dog leg portion adjacent the point 31. The wire tie piece 30a may be bent down at its inner end to provide a hook 36. Additional means for attaching the arm rest frame in position comprises a rearwardly extending dowel pin 37.

Mounted upon the upper generally rectangular frame portion, comprising members 28—30, is a layer of padding material which in the present instance comprises a section of sponge rubber 38. Cemented to the bottom of the sponge rubber pad 38 is a layer of reinforcing fabric or non-metallic material 39 (see particularly Figs. 5 and 10) which in the present instance comprises a coarse woven jute fabric impregnated with a plastic material such as asphalt composition. The layer 39 may be connected along its edges to the sections 28, 29 and 30 in the manner shown in Fig. 8. In this instance the material 39 around its edges has a heavy binding 40 of leatherized or other suitable material embracing the edges of the fabric 39 and stitched thereto, a wire or cord 41 being held by the binding so as to provide a thickened or beaded edge. This edge is embraced and held between the jaws of a series of metal clips 42 which embrace the wire portions 28, 29 and 30 in such manner as to permit the clips to turn slightly upon the wire frame to allow for greater flexibility of the fabric backing 39 for the rubber pad 38.

The upper forward end of the frame and the dog leg portion may be covered by a relatively stiff layer of material such as fiber board, indicated at 43. The layer 43 is connected at its edges to the wire sections 28a, 29a, 28b and 29b through the medium of clips 44, in the manner shown in Fig. 7. In the present instance a layer of cotton batting or the like 45 extends over the top surface of the rubber pad 38 and also the layer of fiber board 43, and over this extends a trim fabric 46. It will be seen from Figs. 2 and 3 that the fabric material 46 covers the entire outer side of the frame, the top and the dog leg portion thereof. This fabric is stretched across the frame and padding and the edges are folded around the wire sections 29, 30, 32 and 34 and secured thereto by clinched staples 47, in the manner shown in Fig. 9.

From the foregoing it will be seen that the arm rest unit 27 comprises a detachable member which may be assembled as a unit upon the body, such as in the manner shown in Figs. 5 and 10. The arm rest is secured in place to the inner metal body panel 48 by passing the hook 36 through an aperture 49 in the panel and also by passing the dowel pin 37 through an eye bracket 50 spot welded to the upper face of the wheel housing 26.

A second embodiment of the invention is illustrated in Figs. 11 to 16 inclusive comprising a padded fabric covered wire formed frame, indicated generally at 51, mounted within the automobile body over the wheel housing as illustrated in Fig. 11. The wire formed skeleton frame for the arm rest unit 51 is illustrated in Fig. 14 and comprises a top generally rectangular supporting frame comprising spaced longitudinal courses 52 and 53 and end courses 54 and 55. Extended downwardly from the forward end of the course 52 is a depending leg 56 and extended downwardly while slanting inwardly from the juncture of the sections 53 and 54 is a depending leg 57. The legs 56 and 57 are joined at their bottom by a section 58. A brace piece 59, generally parallel to the leg 56, joins the sections 52 and 58. An angular wire brace section 60 joins the courses 53, 55 with the leg 56. A cross strap 61 connected to the upper courses 52 and 53 is provided at its inner end with a depending hook 62. The upper end of the frame adjacent the juncture of the portions 53 and 54 is provided with a rearwardly projecting dowel piece 62a.

The upper frame portion 52—55 together with the spaced portions 60 and 56 provide a skeleton support for a sponge rubber pad 63. If desired this pad may be reinforced at its bottom face by a fabric sheet such as shown at 39 in the previous embodiment, and this rubber pad is mounted directly upon the wire frame as shown in Figs. 15 and 16. It is flexibly connected thereto such as by means of adhesive fabric strips 64 which are cemented to the bottom of the rubber pad (see Fig. 16) and extend beneath the wire sections 52—55 and 60. The top and sides of the rubber pad may be covered with a layer of cotton batting or similar padding material 65 and the entire frame and pad are then covered by means of a layer of trim fabric material 66. The trim fabric is preformed as to size and shape to fit over the top horizontal frame 52—55 after the installation of the rubber pad 63. Two short depending sides of the fabric extend around and beneath the wire members 52 and 54 and may, if desired, be secured to the bottom of the pad 63 or the reinforcing sheet therebeneath as by cementing. Adjacent the wire frame members 53 and 55 the remaining sides of the preformed fabric cover extend to the bottom member 58 and are formed so as to extend snugly around the wire members 56 and 60, the vertical edges of the fabric terminating at the wire members 57 and 59 to which the fabric is secured by stapling as shown in Fig. 13. The lower edge of the fabric is drawn tightly around the wire 58 and stapled thereto as shown in Figs. 12 and 13. The assembled arm rest of this embodiment, illustrated in Fig. 13, is assembled upon the body over the wheel housing in a manner similar to the previous embodiment through the medium of the hook 62 which is hooked through an aperture in the inner body panel 48 and through the medium of the dowel piece 62a which is passed through an eye bracket attached to the inner face of the wheel housing.

A third embodiment of the invention is illustrated in Figs. 17 and 18 comprising a padded fabric covered wire formed frame also mounted within the automobile body over the wheel housing similarly to the arm rest 51 illustrated in Fig.

11. The wire formed skeleton frame for the arm rest unit of Figs. 17 and 18 comprises a top generally rectangular supporting frame comprising spaced longitudinal courses 66a and 67 and end courses 68 and 69. Extending downwardly from the forward end of the course 66a is a depending leg 70 and extended downwardly while slanting inwardly from the juncture of the sections 67 and 68 is a depending leg 71. The legs 70 and 71 are joined at their bottom by a bowed section 72. A brace piece 73, generally parallel to the leg 70, joins the upper section 66a with the lower end of a leg 70 and also a second leg 74, the latter being joined to the top frame at the juncture of the portions 67 and 69. A cross strap 75 is connected to the upper portions 66a and 67 and is provided at its inner end with a depending hook 76. Secured to an angle bend in the leg 71 is a rearwardly projecting dowel piece 77.

The top, front and inner side of the frame of Fig. 17 is in the present instance covered by means of a fabric sheet 78 which may comprise, for example, a layer of woven jute material impregnated at its outer face with a plastic substance, such as an asphalt composition. It will be noted that the fabric sheet 78 is tightly stretched over the upper frame portions 74, 76 and 71a and also over the top rectangular frame 66a, 67, 68 and 69. The edge of the sheet 78 is folded around the upper end of the wire 73 and stapled at 79 in the manner shown in Fig. 9. Another edge of the fabric 78 is folded around the wire portions 66a, 68 and 71a and stapled as at 79 in the same manner as shown in Fig. 9. The top and end portions 78a and 78b of the fabric 78 support a sponge rubber pad 80 which is shaped in accordance therewith and cemented to the fabric. The structure of Fig. 18 is then covered with a preformed trim fabric in the same manner as described in connection with the previous embodiment, there being preferably a layer of cotton batting or the like interposed between the outer trim fabric and the outer faces of the rubber pad 80. The fabric is stretched across the top of the frame with two edges folded around and underneath wire courses or sides 66a and 68 and fastened to the bottom of the fabric portion 78a by cementing. The fabric at the inner and front sides extends down to the wire member 72, the vertical edges terminating at the wire members 71 and 73. The fabric is drawn tightly around members 71, 72 and 73 and stapled thereto. It will be understood that the arm rest of the embodiment of Figs. 17 and 18 may be installed within the vehicle body in the same manner as the previous embodiment, such as shown in Fig. 11.

From the foregoing it will be seen that the present arm rest, as illustrated by the several embodiments herein exemplified, comprises a skeleton frame having a top pad supporting portion including wire framing members and also depending wire members connected together below the top frame; a cushion pad preferably of sponge rubber mounted on the pad supporting portion of the skeleton frame; means such as the heavy fabric 78 of Fig. 18, or the backing fabric 39 and clips 42 of the embodiment of Figs. 2 to 10 inclusive, or the adhesive strips 64 of the embodiment of Figs. 11 to 16 inclusive, for securing the pad to various of the wire framing members; and a trim fabric covering the pad and inner side of the frame and connected to certain of the wire framing members as by folding the fabric back upon itself tightly therearound and stapling as shown in Fig. 9. It will also be understood that the separate wire members forming the skeleton framework may be joined together at indicated points in any suitable manner such as by spot welding, soldering or the like. In the embodiment of Fig. 18 the outer trim or upholstery fabric 66, after being stretched over the pad and the wire frame, is folded back upon itself over the wire portions of the frame and in this instance the staples 79 which secure these folded portions together also pass through the foundation or backing sheet 78. If desired the trim fabric 66 and backing sheet 78 may be simultaneously secured to the wire members by means of a single set of staples or other fastening means.

I claim:

1. An arm rest skeleton frame structure for a vehicle body, comprising a top generally horizontal wire formed frame, an upright wire formed frame connected to said top frame, said upright frame including longitudinally spaced wire members extending downwardly from points on said top frame adjacent its forward end portion, and a wire member connected to said top frame and extending downwardly therefrom toward the bottom of said upright frame and transversely with respect thereto, said last named wire member being connected to one of said longitudinally spaced wire members at a point below the top frame.

2. An arm rest skeleton frame structure for a vehicle body, comprising a top generally horizontal wire formed frame, an upright wire formed frame connected to said top frame, said upright frame including longitudinally spaced wire members extending downwardly from points on said top frame adjacent its forward end portion, and a wire member connected to said top frame at a point spaced transversely from one of said longitudinally spaced members and extending downwardly therefrom toward the bottom of said upright frame, said last named wire member being connected adjacent its lower end to one of said longitudinally spaced wire members.

3. In an arm rest structure for a vehicle body in which said structure includes a skeleton frame adapted to receive a fabric covered cushion pad; said skeleton frame comprising a top pad supporting portion including spaced longitudinal wire framing members connected together, and spaced depending wire members extending in converging relation and interconnected below said pad supporting portion.

4. In an arm rest structure for a vehicle body in which said structure includes a skeleton frame adapted to receive a fabric covered cushion pad; said skeleton frame comprising a top pad supporting portion including spaced longitudinal wire framing members connected together at their ends, and spaced wire members extending downward in converging relation from the front end of said top portion and interconnected below said top portion.

5. In an arm rest structure for a vehicle body in which the structure includes a wire formed frame adapted to receive a fabric covered sponge rubber pad; said frame comprising a top generally horizontal pad supporting frame portion, and a depending wire formed frame portion connected to opposite front and rear ends of the said top frame portion and having members converging downwardly toward the front thereof.

6. In an arm rest assembly adapted to be mounted as a unit upon a support in which said assembly includes a wire formed skeleton frame adapted to receive a fabric covered pad; said wire formed skeleton frame comprising a top generally horizontal pad supporting portion, and a depending side portion connected to the top portion and comprising downwardly converging frame members.

7. In an arm rest structure, a wire formed skeleton frame comprising a top pad supporting portion, a plurality of longitudinally spaced depending wire members connected to said top portion, and a depending laterally spaced wire member connected at its upper end to said top portion and extending at an angle to one of said longitudinally spaced wire members and connected thereto at a point intermediate the ends of said last named wire member.

8. In an arm rest structure, a skeleton frame comprising a top pad supporting portion including spaced longitudinal wire framing members interconnected at their ends, and a plurality of spaced wire members depending below said supporting portion and connected at their upper ends to said portion, two of said wire members extending in converging relation toward their lower ends.

9. In an arm rest structure for a vehicle body, a skeleton frame comprising a top generally horizontal wire formed frame portion, and a depending wire formed frame portion projecting downwardly from said top frame portion and having members converging downwardly at the front of the arm rest, said depending frame portion including a single wire member extending downwardly from the rear of the top portion and having its lower end connected to one of said converging members.

10. In an arm rest for a vehicle body, a wire formed skeleton frame including a top generally horizontal pad supporting portion comprising a wire bent to form two spaced longitudinal members connected at their rear ends, the forward ends of said members being bent downwardly in converging relation and connected together, a depending wire member extending from the rear end of the top portion, and a wire member connecting the lower end of the latter member to the lower end of one of said converging members.

11. In an arm rest for a vehicle body, a wire formed skeleton frame including a top generally horizontal pad supporting portion comprising a wire bent to form two spaced longitudinal members connected at their rear ends, the forward ends of said members being bent downwardly in converging relation and connected together at a point below said top portion, and a depending wire member extending from the rear end of the top portion and connected at its lower end to one of said converging members.

EDWARD R. HATHAWAY.